Figure 1:
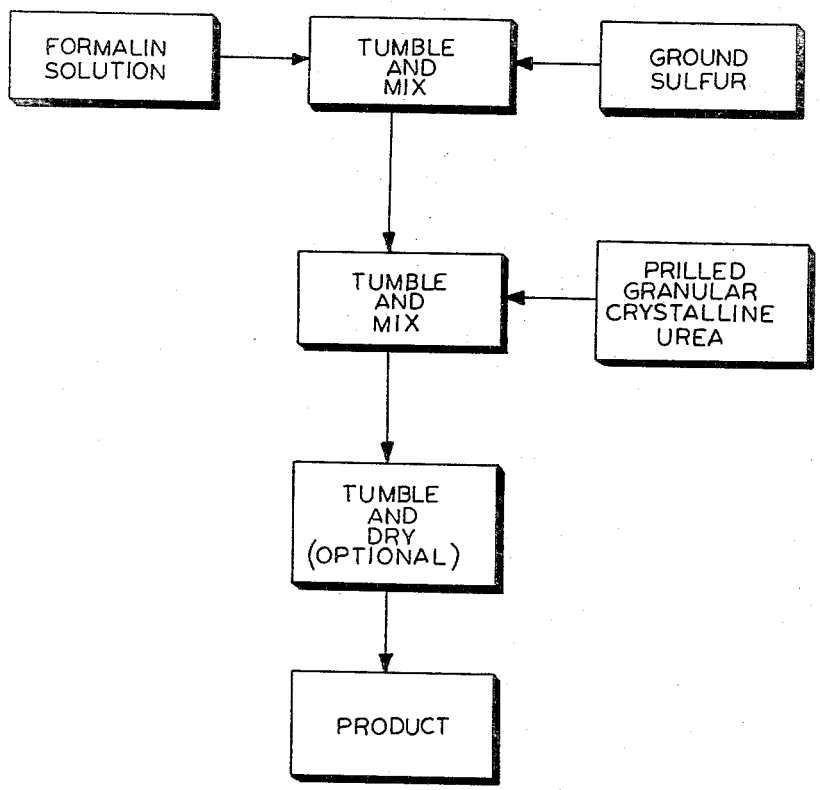

April 11, 1967  A. W. GREEN  3,313,613
SULFUR-COATED UREA FERTILIZER AND METHOD OF MAKING
Filed Feb. 27, 1964  2 Sheets-Sheet 1

INVENTOR
ALBERT W. GREEN

BY
ATTORNEY

United States Patent Office 3,313,613
Patented Apr. 11, 1967

3,313,613
SULFUR-COATED UREA FERTILIZER AND
METHOD OF MAKING
Albert W. Green, Yazoo City, Miss., assignor to Mississippi Chemical Corporation, Yazoo City, Miss., a corporation of Mississippi
Filed Feb. 27, 1964, Ser. No. 347,794
11 Claims. (Cl. 71—28)

This invention relates to a urea-sulfur mixture and to a process for its production.

Elemental sulfur is commonly employed in mixtures with urea as fertilizer, most commonly for fertilizer used in the western part of the United States because western soils are frequently deficient in sulfur, a necessary plant nutrient. Also, sulfur acts as a fungicide, soil conditioner, improves water penetration, helps neutralize soil alkalinity and assists in solubilizing other residual soil nutrients.

The preparation of such urea-sulfur fertilizer mixtures presents manufacturing problems because powdered sulfur does not adhere to the surface of urea prills or granules. Therefore, it is difficult if not impossible to uniformly blend large amounts of urea and sulfur so that when the blended mixture is bagged or otherwise packaged, proportional units will have approximately the same urea: sulfur ratio. Invariably, the sulfur settles to the bottom in the mixing chamber so that if the mixing chamber is emptied from the top, the first portions will have less than the average sulfur content and the last portions will have higher than average sulfur content. If the mixing chamber is bottom emptied, the reverse will be true.

Furthermore, even if the urea and sulfur were uniformly blended during manufacture and packaging, the sulfur in the packaged mixture readily separates to the bottom when the package is jarred, moved or shaken during shipping, thus presenting an obviously non-uniform product to the consumer.

In recent years, a method has been developed to prevent such settling and separation of the sulfur from the urea which involves melt-blending the urea and sulfur. See U.S. Patent 3,100,698. Such a technique is said to also produce a fertilizer resistant to caking. However, such a technique has the obvious disadvantage of requiring a specialized equipment not possessed by some fertilizer manufacturers. Also, such a procedure is more expensive than procedures which do not require melting the materials and handling the melt. Furthermore, because elemental sulfur is absorbed into the soil at a substantially slower rate than the urea, the correction of sulfur deficiency in soil with a melt-blended fertilizer requires more time or the use of larger amounts of sulfur compared with fertilizers in which the sulfur is present on the surface of the fertilizer particles in fine powder form. Thus, a urea: sulfur mixture which resists settling of sulfur, which is free-flowing and which retains the sulfur in discrete particle form immediately available for leaching by the soil has commercial and practical advantages not possessed by conventional dry mixtures of urea and sulfur or melt-blended mixtures of urea and sulfur.

Accordingly, it is an object of this invention to provide a novel method for combining elemental sulfur with urea to produce a stable, uniform mixture.

Another object of this invention is to produce free-flowing urea-sulfur mixtures in which the sulfur has substantially greater exposed surface area than the urea.

Another object is to prepare as a novel article of manufacture solid urea particles having uniformly distributed on the surface thereof adhering particles of solid elemental sulfur.

Other objects will be apparent to those skilled in the art to which this invention pertains.

According to this invention, novel urea-sulfur mixtures comprising solid urea particles having uniformly distributed on the surface thereof a minor proportion of substantially smaller particles of solid elemental sulfur firmly adhering thereto are prepared by a method which comprises the step of blending solid elemental sulfur particles, wet with aqueous formaldehyde, with solid urea particles.

The urea particles ordinarily will be substantially larger than the sulfur particles. Prills or granules of urea are usually employed although crystalline or powdered urea can also be used. Preferably, the majority of the urea particles are substantially larger than 200 mesh (U.S. Standard sieve).

The sulfur particles employed ordinarily are substantially smaller than the urea particles. Desirably, finely powdered, e.g. no larger than about 200 mesh, sulfur is employed.

The formaldehyde is conventionally employed as an aqueous solution, e.g., commercial grade 40 percent formalin, although other solution concentrations and dispersions of paraformaldehyde and water can be employed. It is desirable to employ less than 7 to 10 percent water, calculated on the sulfur, to prevent caking of the sulfur.

In the process of this invention a minor proportion of formaldehyde is employed, e.g., about 4 percent to about 15 percent by weight, more preferably about 7 to about 12 percent, calculated on the weight of the sulfur. The amount of sulfur employed is preferably about 2 percent to about 30 percent, more preferably about 4 to about 15 percent, of the weight of the urea. The proportions of these three ingredients are preferably adjusted so as to provide a fertilizer composition consisting on a dry-weight basis of from about 75 to about 95 percent urea, from about 22 to about 4 percent elemental sulfur and from about 3 to about 0.2 percent formaldehyde. The preferred composition of this invention consists essentially of these three ingredients within the above proportioned ranges. However, such a mixture can be blended with other ingredients, commonly employed in fertilizers so as to provide potash, and/or phosphates and other soil nutrients.

In carrying out the process of this invention solid urea particles are blended with solid elemental sulfur particles wet with aqueous formaldehyde. The formaldehyde apparently acts as a binder because the sulfur adheres to the urea in the blended urea-sulfur mixture much more firmly than when urea is blended with dry sulfur or sulfur wet with water alone. In all likelihood, this is due to the formation of methylol derivatives, e.g., monomethylolurea, of urea at the points of contact of the formaldehyde-bearing sulfur particles with the urea particles.

The resultant urea-sulfur blend can then be dried, if desired, to remove the water of the aqueous formaldehyde from the mixture, e.g., by heating the mixture. However, this drying step is not necessary, particularly when small amounts of a concentrated formaldehyde solution is employed. Whether drying should be employed, depends generally on the caking and flow characteristics of the resultant mixture. As the amount of water present in the mixtures of this invention will generally be below about 5 percent, drying usually is not employed.

Sulfur wet with aqueous formaldehyde is readily obtained by gradually adding formalin of the selected concentration to rapidly tumbling sulfur particles to ensure reasonably uniform distribution. Although complete uniformity is not vital, because of the relatively small amount of formaldehyde compared to sulfur employed, the more uniform the mixing, the more uniform and more resistant to settling will be the resultant urea-sulfur mixture.

Figure 2:
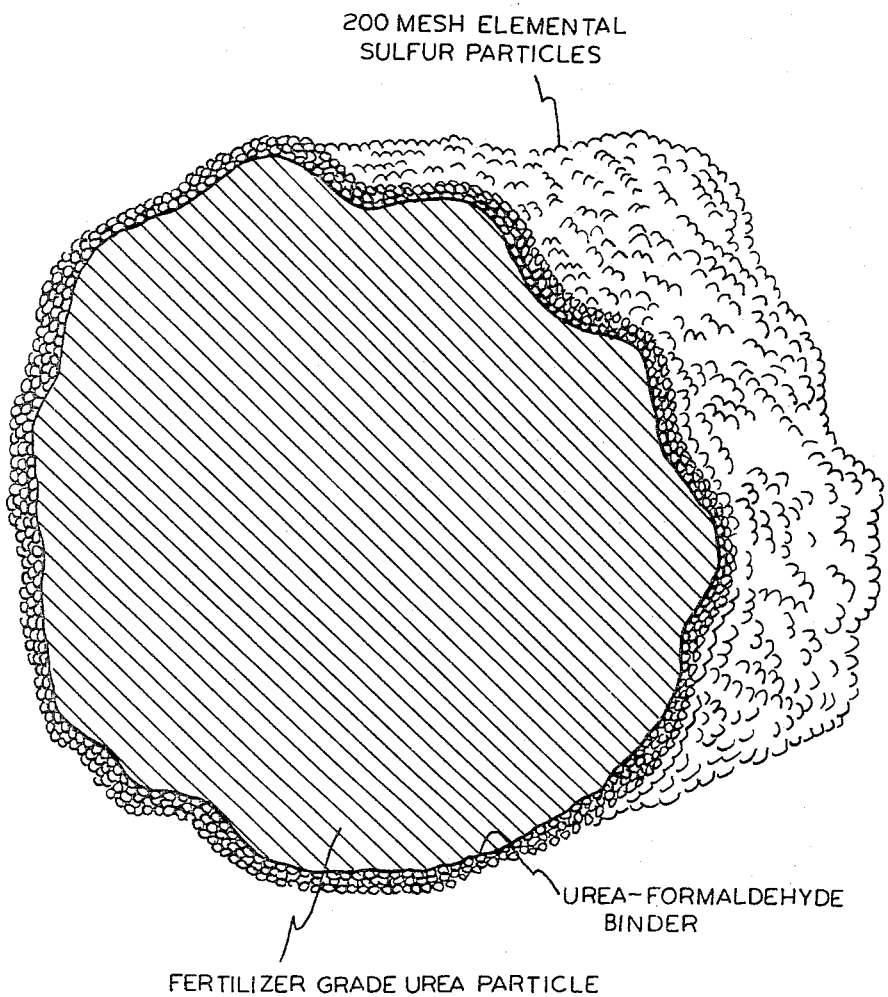

This invention is illustrated by the accompanying sheet of drawings in which FIGURE 1 is a flow sheet of a method of preparing the urea-sulfur composition shown in FIGURE 2. FIGURE 2 is an enlarged schematic cross-sectional view of a urea particle surrounded by smaller particles of elemental sulfur adhering to the urea particle by the urea-formaldehyde binder between the sulfur particles and the urea particle according to this invention.

The following examples are illustrative of the process and products of this invention which are not limited thereto.

*Example 1.*—Finely powdered sulfur (100% to pass 200 mesh U.S. Standard sieve) was thoroughly mixed with about 23 percent by weight of a 40 percent formalin solution (37 weight percent formaldehyde). This mixture was added to about 10 to 11 times its weight of fertilizer grade urea prills in a mixing container. The covered container was tumbled and turned for about five minutes to thoroughly and uniformly coat the surface of all of the urea prills with the sulfur-formaldehyde mixture. The composition of the resulting mixture was urea 92.4%, sulfur 7.0% and formaldehyde 0.6% (dry weight basis).

*Examples 2–6.*—In exactly the same manner as described in Example 1, other urea-sulfur mixtures prepared by coating prilled or granular urea with varying amounts of powdered sulfur, wet with varying amounts of aqueous formaldehyde. The proportions of the resulting mixtures are listed below:

PERCENT COMPOSITION (DRY BASIS)

| Example Number | Weight percent Urea | Weight percent Sulfur | Weight percent Formaldehyde |
| --- | --- | --- | --- |
| 2 | 95.1 | 4.3 | 0.6 |
| 3 | 95.3 | 4.3 | 0.4 |
| 4 | 89.7 | 9.5 | 0.8 |
| 5 | 88.5 | 10.7 | 0.8 |
| 6 | 77.6 | 20.0 | 2.4 |

All of the thus obtained mixtures of urea and sulfur were markedly more uniform throughout as to urea:sulfur ratios than comparable mixtures of urea and sulfur prepared without formaldehyde. The dried mixtures when shaken retained their uniform urea:sulfur ratio with substantially less segregation than a comparable uniform mixture of urea and sulfur prepared by carefully blending comparable proportions of the same urea prills and dry, finely powdered sulfur. The mixtures were thus suited for commercial use as fertilizers.

What is claimed is:

1. A method for combining elemental sulphur with urea to produce a uniform urea-sulfur physical mixture which comprises the step of admixing a minor proportion of solid elemental sulfur particles, moistened with a minor proportion with respect to the sulfur of aqueous formaldehyde, with a major proportion of solid urea particles, to form a uniform stable blend of sulfur particles adhering to the urea particles.

2. A method according to claim 1 wherein the amount of formaldehyde is from aout 4 percent to about 15 percent of the weight of the sulfur.

3. A method according to claim 2 wherein the amount of sulfur employed is about 2 percent to about 30 percent of the weight of the urea.

4. A method according to claim 1 wherein the amount of formaldehyde employed is from about 7 percent to about 12 percent of the weight of the sulfur which, in turn, is about 4 percent to about 15 percent of the weight of the urea.

5. A method according to claim 1 wherein the urea particles are substantially larger than the sulfur particles.

6. A method for combining elemental sulfur with urea to produce a physical mixture thereof which resists separation of the sulfur from the urea which comprises the steps of moistening solid elemental sulfur particles with a minor proportion of aqueous formaldehyde and uniformly mixing a minor proportion of the resultant mixture with a major proportion of solid urea particles.

7. A method according to claim 6 wherein the urea particles are substantially larger than the sulfur particles.

8. A method according to claim 6 wherein the amount of formaldehyde employed is from about 7 percent to about 12 percent of the weight of the sulfur which, in turn, is about 4 percent to about 15 percent of the weight of the urea.

9. Solid urea particles having uniformly distributed on the surface thereof a minor proportion of substantially smaller particles of solid elemental sulfur particles bonded to the urea by a urea-formaldehyde composition, present at the interface between the urea and sulfur particles in a minor proportion with respect to both the urea and the sulfur.

10. A fertilizer composition according to claim 9 consisting on a dry weight basis essentially of from about 75 to about 95 percent urea, from about 22 percent to about 4 percent elemental sulfur and from about 3 percent to about 0.2 percent formaldehyde.

11. A fertilizer composition according to claim 10 wherein the urea particles are prills and substantially all the sulfur particles are no larger than about 200 mesh.

References Cited by the Examiner

UNITED STATES PATENTS

| | | | |
| --- | --- | --- | --- |
| 847,749 | 3/1907 | Ellis | 71—23 |
| 2,161,035 | 6/1939 | Gilbert | 71—64 |
| 2,618,546 | 11/1952 | Davenport | 71—28 |
| 2,766,283 | 10/1956 | Darden | 71—28 |
| 3,100,698 | 8/1963 | Horsley et al. | 71—28 |
| 3,206,297 | 9/1965 | O'Connor | 71—28 |
| 3,248,255 | 4/1966 | Belasco | 71—28 |

S. LEON BASHORE, *Acting Primary Examiner.*

DONALL H. SYLVESTER, *Examiner.*

A. SCIAMANNA, T. D. KILEY, *Assistant Examiners.*